United States Patent
May

(10) Patent No.: US 8,176,685 B2
(45) Date of Patent: May 15, 2012

(54) PROTECTIVE SHEET MADE FROM A BLEND OF ETHYLENE VINYL ACETATE (EVA) AND POLYETHYLENE (PE)

(75) Inventor: David May, Durham, NC (US)

(73) Assignee: Trimaco, LLC, Morrisville, NC (US)

( * ) Notice: Subject to any disclaimer, the term of this patent is extended or adjusted under 35 U.S.C. 154(b) by 603 days.

(21) Appl. No.: 11/850,804

(22) Filed: Sep. 6, 2007

(65) Prior Publication Data
US 2008/0066420 A1    Mar. 20, 2008

Related U.S. Application Data

(60) Provisional application No. 60/844,490, filed on Sep. 14, 2006.

(51) Int. Cl.
| | |
|---|---|
| E04B 1/34 | (2006.01) |
| E04B 5/00 | (2006.01) |
| E04B 1/62 | (2006.01) |
| E04B 1/00 | (2006.01) |
| E04F 11/16 | (2006.01) |
| B32B 3/00 | (2006.01) |
| D06N 7/04 | (2006.01) |

(52) U.S. Cl. ............ 52/3; 52/177; 52/515; 52/408; 52/741.3; 52/DIG. 14; 428/156; 428/141

(58) Field of Classification Search ........... 52/3, 515, 52/408, 741.3, DIG. 14, 177, 180; 428/156, 428/141
See application file for complete search history.

(56) References Cited

U.S. PATENT DOCUMENTS

| | | | |
|---|---|---|---|
| 3,895,153 A * | 7/1975 | Johnston et al. ............ 428/141 |
| 3,909,144 A | 9/1975 | Garn et al. | |
| 4,561,110 A | 12/1985 | Herbert | |
| 4,590,714 A * | 5/1986 | Walker ...................... 250/585 |
| 5,156,789 A | 10/1992 | Amaral et al. | |
| 5,226,198 A | 7/1993 | Martin | |
| 5,316,826 A | 5/1994 | Kotani et al. | |
| 5,816,305 A | 10/1998 | May | |
| 5,968,630 A * | 10/1999 | Foster ........................ 428/77 |
| 6,277,241 B1 | 8/2001 | Merker et al. | |
| 6,468,678 B1 | 10/2002 | Dahlin et al. | |
| 6,514,597 B1 * | 2/2003 | Strobel et al. .............. 428/167 |
| 6,541,099 B1 | 4/2003 | Merker et al. | |
| 6,547,926 B2 | 4/2003 | Drew et al. | |
| 6,585,855 B2 | 7/2003 | Drew et al. | |
| 6,607,635 B2 | 8/2003 | Bakken et al. | |

(Continued)

OTHER PUBLICATIONS

International Search Report issued in application No. PCT/US07/78539 (2007).

(Continued)

*Primary Examiner* — Brian Glessner
*Assistant Examiner* — Omar Hijaz
(74) *Attorney, Agent, or Firm* — Barnes & Thornburg LLP

(57) ABSTRACT

A protective sheet and method for protecting an object is disclosed. The protective sheet or drop cloth is made from a blend comprising ethylene vinyl acetate (EVA) and polyethylene (PE), making it naturally liquid impervious and slip resistant. The protective sheet includes a top side having a raised surface design configured for retaining fluid, and a bottom side that is smoother than the top side for added slip resistance. The method comprises the steps of providing the protective sheet and positioning it over the object, wherein the top side faces away from the object, and the bottom side faces the object and the top side is available for a workman to walk on.

17 Claims, 4 Drawing Sheets

U.S. PATENT DOCUMENTS

| | | |
|---|---|---|
| 6,676,807 B2 | 1/2004 | Hada et al. |
| 6,802,924 B2 | 10/2004 | Merker et al. |
| 6,911,407 B2 | 6/2005 | Sherrod et al. |
| 6,939,440 B2 | 9/2005 | Drew et al. |
| 6,949,166 B2 | 9/2005 | Bakken et al. |
| 7,028,365 B2 | 4/2006 | Martin et al. |
| 2001/0055927 A1 | 12/2001 | May |
| 2002/0037393 A1* | 3/2002 | Strobel et al. ............... 428/156 |
| 2002/0084048 A1 | 7/2002 | Merker et al. |
| 2004/0181893 A1 | 9/2004 | Martin et al. |
| 2005/0022953 A1 | 2/2005 | Merker et al. |
| 2007/0275209 A1* | 11/2007 | Netravali et al. ............... 428/99 |

OTHER PUBLICATIONS

"Vinylidene Chloride Monomer and Polymers, A Technical Report on VDC and PVDC," Kirk-Othmer: Encyclopedia of Chemical Technology, vol. 24, pp. 882-923 (1997).

* cited by examiner

PROTECTIVE SHEET MADE FROM A BLEND OF ETHYLENE VINYL ACETATE (EVA) AND POLYETHYLENE (PE)

CROSS-REFERENCE TO RELATED APPLICATIONS

This application is a non-provisional application claiming priority to a provisional application No. 60/844,490 filed Sep. 14, 2006, which is herein incorporated by reference.

BACKGROUND OF THE INVENTION

The present disclosure generally relates to a protective sheet and method for protecting an object, surface, or the like.

SUMMARY OF THE INVENTION

The present disclosure provides a protective sheet along with a method for the use of the protective sheet. A protective sheet in accordance with the present disclosure is made from a blend of ethylene vinyl acetate (EVA) and polyethylene (PE). The sheet has a top and bottom side. The EVA and PE blend makes both sides of the protective sheet slip resistant and liquid impervious, preventing spills from penetrating the protective sheet. The top side is embossed with a raised surface design to reduce the tendency of spills to run off the sheet. The bottom side is embossed to achieve a smoother surface, increasing the friction coefficient and improving slip resistance.

The method comprises positioning the sheet described above over the top surface of a protected object, such that the top side faces away from the object, and the bottom side faces the object. In one specific embodiment, the method also includes placing work pieces on top of the sheet and a workman walking or working on the protective sheet.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
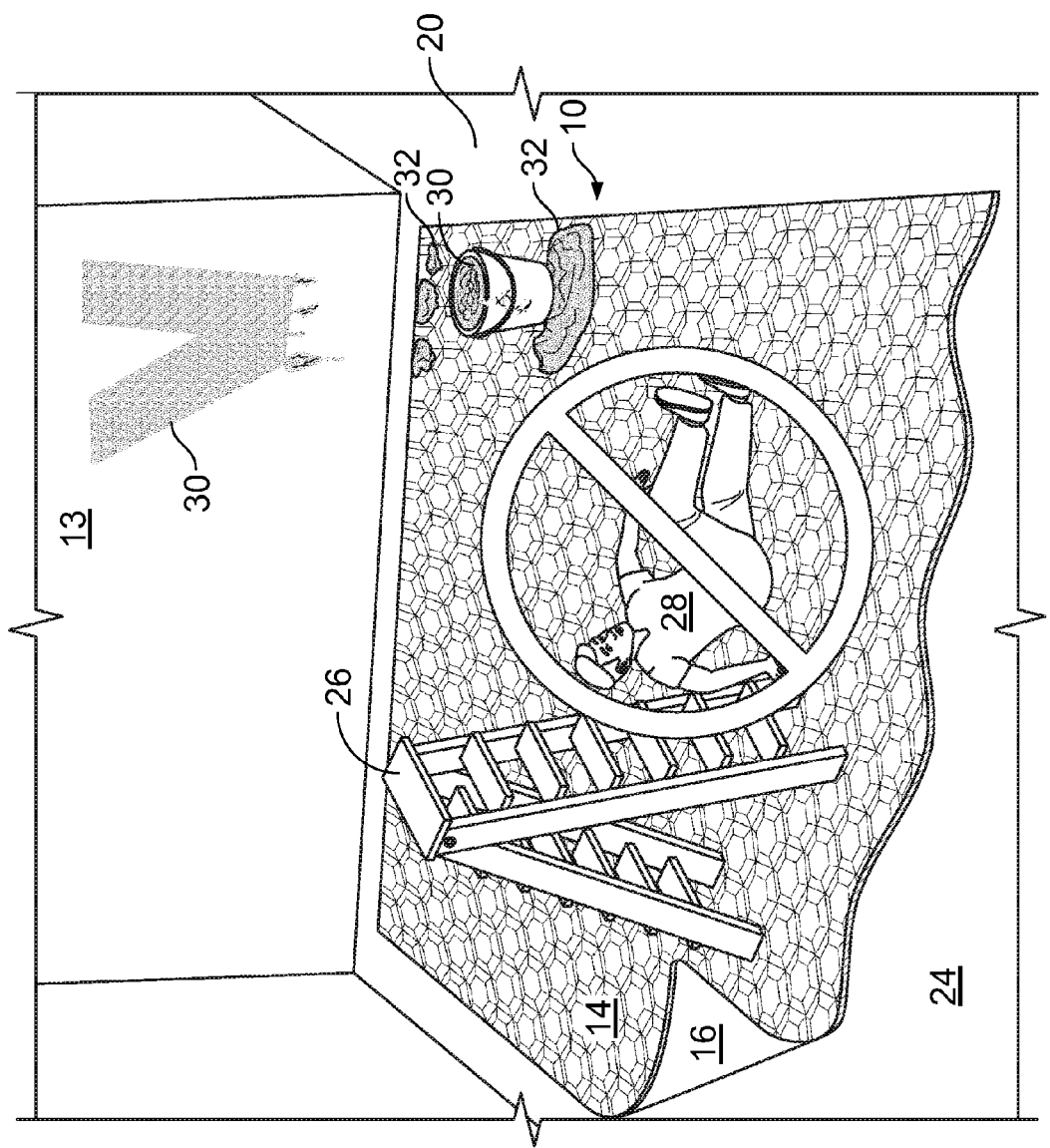
FIG. 1 is a perspective view of a room including walls, a floor covered with a protective sheet, a ladder, a workman, fluid, and spills, and showing the workman being saved from either slipping on the protective sheet or slipping off the ladder as a result of the ladder slipping on the protective sheet.

The protective sheet 10 (also commonly referred to as a drop cloth, drop cover, or protective cover) in accordance with the present disclosure is made from a blend of ethylene vinyl acetate (EVA) and polyethylene (PE). The protective sheet 10 has a top side 14 and bottom side 16. The EVA and PE blend makes both the top side 14 and bottom side 16 of the protective sheet 10 slip resistant. The EVA and PE blend also makes the protective sheet 10 liquid impervious, preventing a spill 32 from penetrating the protective sheet 10. The top side 14 is embossed or textured with a raised surface design 20 to reduce the tendency of spills 32 to run off the protective sheet 10. The bottom side 16 is embossed to achieve a smoother surface 22, improving the friction coefficient and slip resistance of the protective sheet 10 to reduce the chances of falls and help hold the protective sheet 10 in place.

The protective sheet 10 is made from a sheet or film of a blend comprising EVA and PE. The percentage of EVA in the blend varies between about 20 percent and about 100 percent, with the balance being PE. Thus, in one embodiment, the protective sheet 10 is a sheet made from 100 percent EVA. In another embodiment, the protective sheet 10 is a sheet made from about 20 percent EVA and about 80 percent PE. In still another embodiment, the drop cloth is a sheet made from about 50 percent EVA and about 50 percent PE.

The EVA and PE blend has excellent adhesive properties, good flex crack resistance, is solvent-resistant, liquid impervious, and is flexible. The EVA imparts a tactile or adhesive property to the protective sheet 10. Accordingly, the protective sheet 10 is slip resistant on both top and bottom sides 14 and 16 and becomes more slip resistant with the more EVA that is added to the blend. The EVA and PE Blend also makes the protective sheet 10 liquid impervious, resisting the leak through of spills 32. In addition, protective sheet 10 made from the EVA and PE is durable and drapes nicely over objects.

Figure 2:
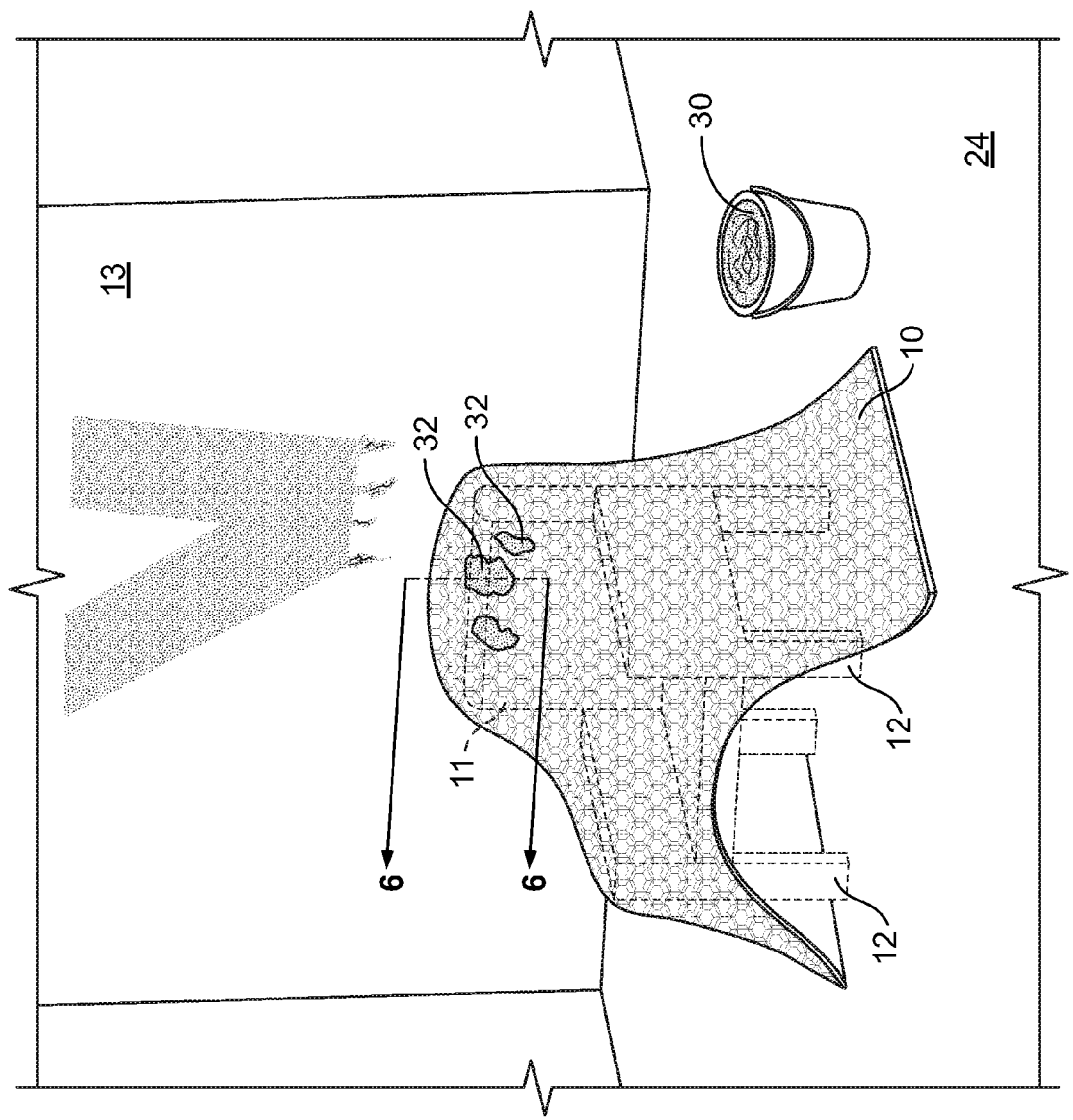
FIG. 2 is a perspective view of a room including walls, a floor, a chair covered with the protective sheet, fluid, and spills, and showing the protective sheet not slipping off the chair and also showing the spills being prevented from dripping onto the chair or running off the protective sheet and on to the floor.

FIGS. 1 and 2 show examples of how the protective sheet 10 is used. FIG. 1 shows the protective cover 10 positioned on the floor 24 (or other object to be protected) with a ladder 26 (or other workpiece) being placed on the protective cover 10. FIG. 1 also shows a workman 28, fluid 30, and spills 32.

FIG. 1 illustrates how the protective sheet 10 reduces the chances slips or falls and catches and retains spills 32. The Ø symbol over the workman 28 shows that the protective sheet 10 helped the workman 28 avoid a fall. A slippery surface could cause a workman 28 to fall in a number of ways. The workman 28 could lose her footing on the sheet causing the workman's 28 feet to slip out from under her. The sheet could slip on the surface or object it is positioned over, causing the workman 28 to fall. The workman 28 could also be atop a work piece, such as ladder 26, that slips on the sheet causing the workman to fall off the work piece. The sheet could also slip underneath the work piece, similarly causing the workman 28 to fall.

The chances of such falls are reduced with the protective sheet 10. The adhesive properties created through the EVA and PE blend makes both the top side 14 and bottom side 16 of the protective sheet 10 slip resistant. The smoother surface 22 of the bottom side 16 also increases surface area contact of the protective sheet 10 and the object it is positioned over, such as floor 24, thereby increasing the friction coefficient and slip resistance, and further reducing the risk of the protective sheet 10 slipping out from underneath the workman 28 or ladder 26 and causing a fall.

FIG. 1 also shows fluid 30 being applied to the wall 13 and spilling on the protective sheet 10. The fluid 30 can be applied to the wall 13 by methods such as brushing it on, spraying, rolling, wiping it on with a cloth, electrostatically depositing it on, or similar methods. The protective sheet 10 is positioned so that any spills 32, including fluid dripping, splashing, spilling, or the like, off of or around, the wall 13, or other surface to which fluid 30 is applied, will contact protective sheet 10 rather than the floor 24. As illustrated, the raised surface design 20 of the top side 14 retains the spills 32, reducing the tendency of spills 32 to run off the protective sheet 10 and onto the floor 24.

FIG. 2 similarly shows the protective sheet 10 positioned over, draped over, or covering an object to be protected, this time a chair 12. Chair 12 has a first surface 11 and protective sheet 10 is placed in such a position so as to protect the first surface 11 from coming into contact with spills 32 created from fluid 30 being applied to a wall 13 or other surface. The protective sheet 10 is positioned over the chair 12 with the top side 14 facing upwardly or away from the surface to be protected, such as the surface 11 of the chair 12 as shown in FIG. 2.

Figure 6:
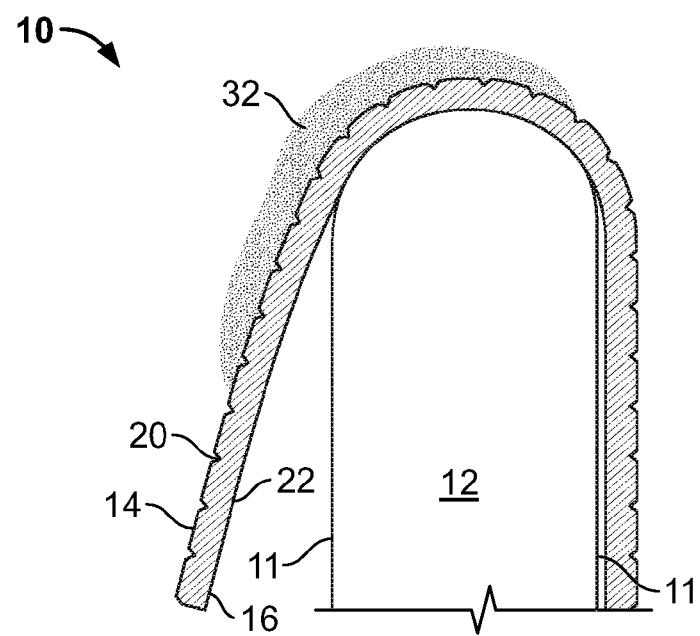
FIG. 6 is an enlarged cross-sectional view taken along line 6-6 of FIG. 2 showing the protective sheet draped over the chair with a spill not penetrating the protective sheet and not running off the protective sheet.

As seen in the enlarged cross section shown in FIG. 6, the first surface 11 is protected from spills 32. The spills 32 will contact protective sheet 10 rather than the chair 12. Additionally, the spill 32 does not penetrate the protective sheet 10 and the raised surface design 20 of the top side 14 reduces the tendency of the spills 32 to run off the protective sheet 10 and onto the floor 24.

FIGS. 2 and 6 also show how the smoother surface 22 of the bottom side 16, along with the, adhesive properties of the EVA and PE blend, reduces the tendency of the protective cover 10 to slip off the chair 12. FIGS. 2 and 6 additionally show the flexibility and drapability of the EVA and PE blend.

Protective sheet 10 is used to protect objects beyond floors 24 and chairs 12. Such objects include, for example, sidewalks, bushes, driveways, walkways, patios, decks, carpets, vinyl flooring, hardwood floors, furniture, machinery, and the like. Similarly, the protective sheet 10 is used to protect against a wide variety of fluids 30, including paint, primer paints, stains, paint thinners, wall paper glue, cleaning solutions, solvents, varnish, water, rain, drinks, oil and the like. The protective sheet is also used to protect against non-fluids, such as snow, ice, grease, dirt, dust, spackle, and even sun light.

Figure 3:
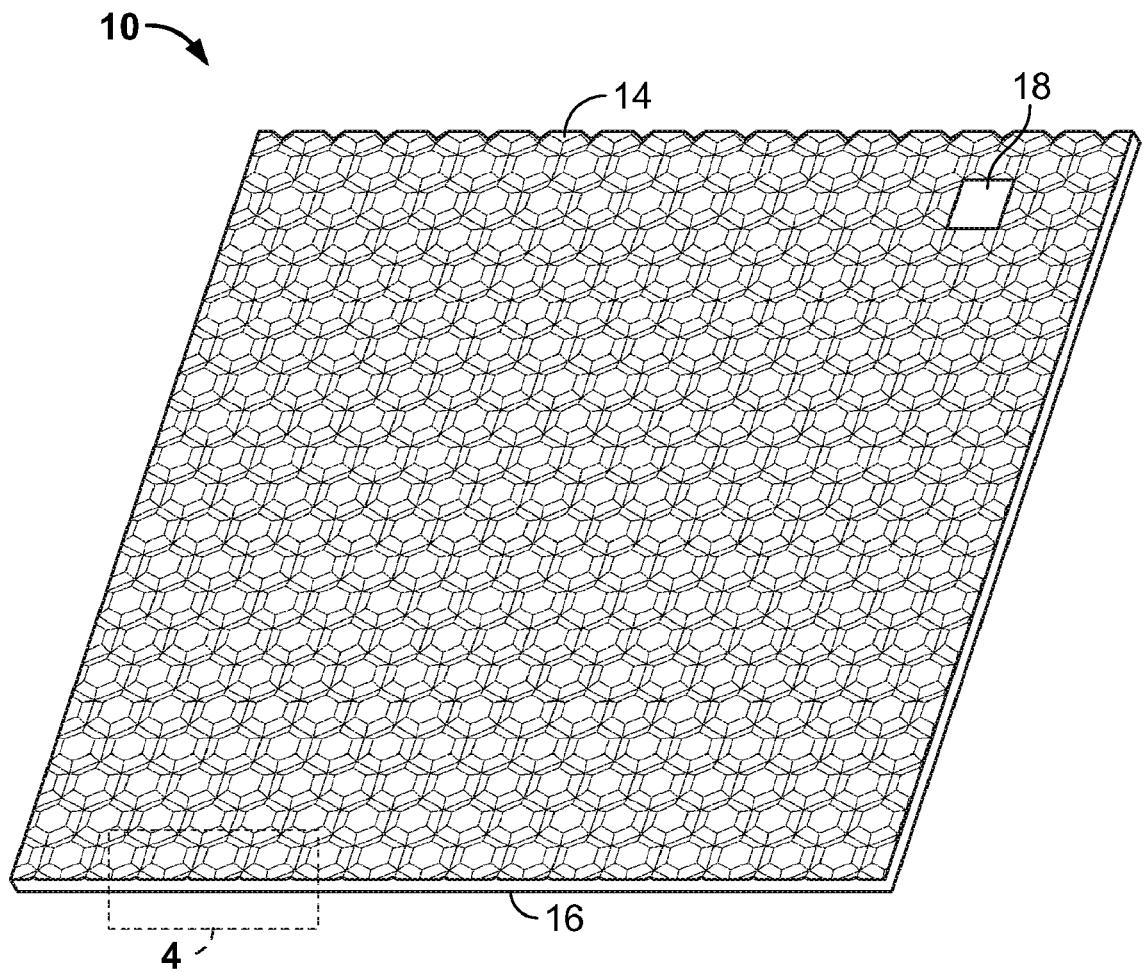
FIG. 3 is a perspective view showing the raised surface design or textured top side of the protective sheet of FIGS. 1 and 2.
Figure 4:
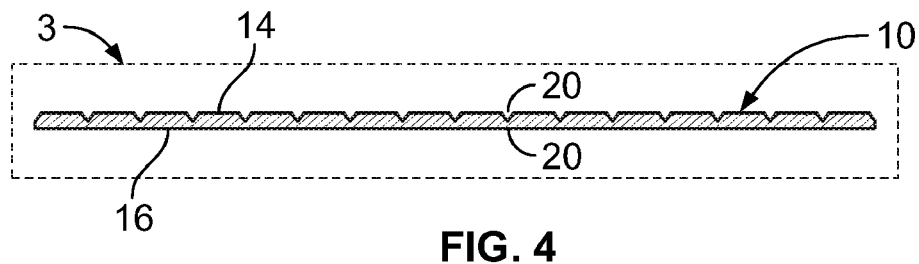
FIG. 4 is a cross sectional view of a portion 4 of the drop cloth of FIG. 3 showing the raised surface design or textured top side of the protective sheet and the smoother bottom side of the protective sheet.
Figure 5:
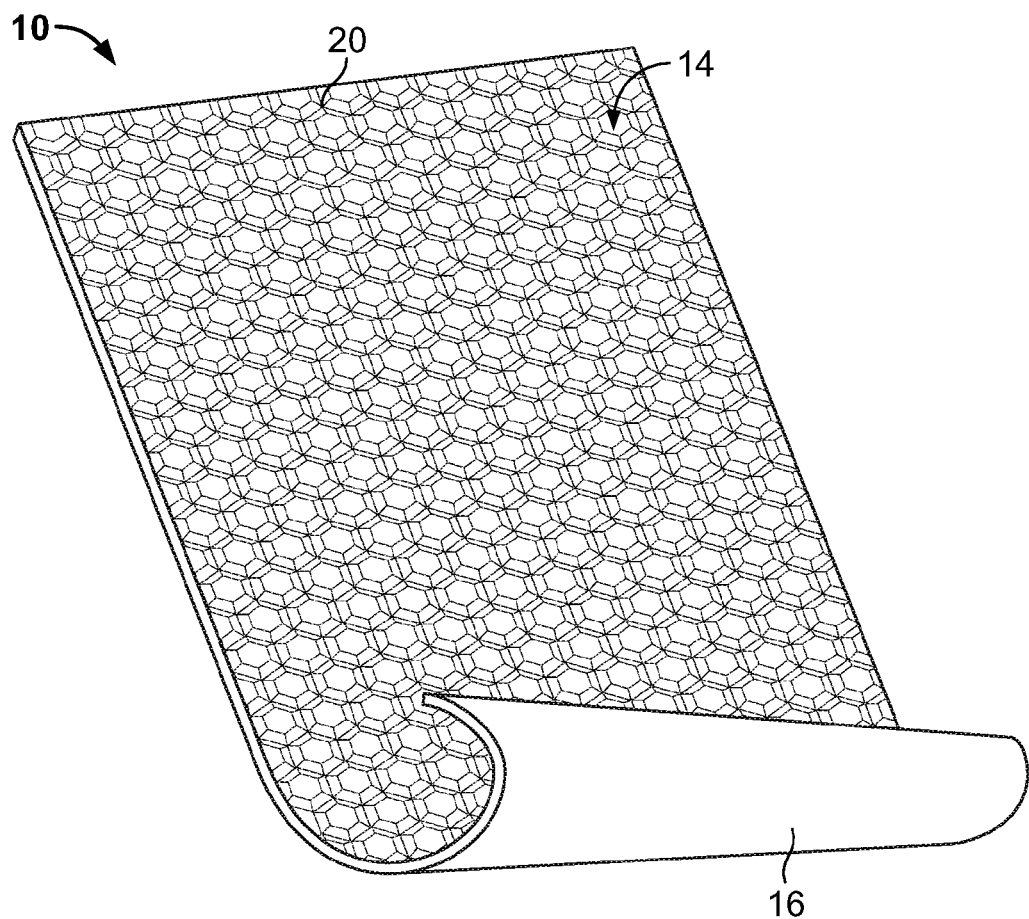
FIG. 5 is an enlarged perspective view showing the raised surface design or textured top side and the smoother bottom side of the protective sheet of FIGS. 1-4.

The raised surface design 20 of the top side 14 is best shown in FIGS. 3, 4, and 5. The raised surface design 20 is characterized by a plurality of raised ridges and may employ a pattern. This pattern can be cross hatches, zig-zags, honeycomb (as in FIG. 5) or any other conceivable pattern or design. The raised surface design 20 may also employ ridges of varying height to provide additional traction to workman 28. This raised surface design 20 can cause the top side 14 to have a fabric-like look and feel.

The bottom side 16 of the protective sheet 10 is smoother than the top side 14 but has some surface texture. The smoother surface 22 increases the amount of surface area contacting the object the protective sheet 10 is draped over as compared with the raised surface design 20, thereby increasing the friction coefficient, and improving the slip resistance. Accordingly, the bottom side 16 is slightly more slip resistant than the top side 14.

In alternative embodiments, both sides of the protective cover have the raised surface designs 20 and in other embodiments both sides have the smoother surface 22. The protective sheet 10 can also be designed so that different portions of the protective sheet 10 have different surface treatments. Some areas can have a raised surface design 20 and other areas can have a smoother surface 22. Application of these surface treatments depends on the properties desired for particular applications of the protective sheet 10. Additional absorbency can be achieved by adding a layer of absorbent material to the top side 14. Additional slip resistance can be achieved by adding a layer of an adhesive material to the top side 14, bottom side 16, or both.

The protective sheet 10 may be produced using a variety of suitable techniques, for example, a casting technique that employs a Flow Casting Film Extrusion machine. With the casting technique, predetermined amounts of EVA and PE resins are mixed together and heated until the mixture reaches the molten state. The molten mixture is then extruded into a thin film of about 2 mm in thickness. With the currently available machine, the width of the film is usually limited to about 4 to 5 feet.

The raised surface design 20 of the top side 14 and smoother surface 22 of the bottom side 14 are created via embossing. The extruded film is passed through an embossing roll that embosses a surface of the film with the desired surface. The embossed film is then passed through a cooling roll before being rolled up for storage. The film may later be cut into sheets of suitable sizes for use as protective sheets 10. The protective sheets 10 may also be enlarged by heating and sealing the edges of two or more protective sheets 10 together.

It is also contemplated that the raised surface design 20 of the top side 14 and smoother surface 22 of the bottom side 16 can be produced by other techniques. For example, the imprinting or etching into a relatively thicker film to create a suitable pattern having peaks and valleys or a fiber-like look can be an alternative to embossing. It is also possible for the smoother surface 22 of the bottom side 16 to be achieved through the extrusion process and without embossing being necessary.

In the illustrated embodiment, the protective sheet 10 is about 9 feet (about 2.74 meters) by about 12 feet (about 3.65 meters). The protective sheet 10 may be of any sizes, for example, the protective sheet 10 maybe about 108 square feet (about 10 square meters). In the illustrated embodiment, due to manufacturing requirements, the protective sheet 10 is made from two sheets, one sheet about 5 feet wide and about 12 feet long and the other sheet about 4 feet wide and about 12 feet long. The two sheets are joined together (for example, by heat sealing) along their respective longitudinal borders to form a drop cloth, which is about 9 feet wide and about 12 feet long. There are no manufacturing limitations related to the length of the protective sheet 10. For example, the protective sheet 10 may very well be made so that it is about 9 feet wide and 15 feet long.

Before embossing, the protective sheet 10 may be about 2 mil (about 50.8 micrometers) thick. After embossing, the protective sheet 10 may be about 4 mil (about 101.6 micrometers) to about 5 mil (about 127 micrometers) thick. The net weight of the 9 feet by 12 feet protective sheet 10 is about 16.5 ounces (about 467 grams).

The protective sheet 10 can also have an identification marker 18, which may be a sticker, a stamp, a marked area, or a tag, that easily identifies the top side 14 or the bottom side 16 of the protective sheet 10 so that the protective sheet 10 can be correctly oriented over the object. As shown in FIG. 3, an identification marker 18 is placed on the top side 14. In an alternative embodiment, the identification marker 18 is placed on the bottom side 16 or on each of the top side 14 and the bottom side 16 to allow easy identification of the top side 14 or the bottom side 16 so that the protective sheet 10 can be properly oriented relative to the surface to be protected.

Although certain illustrative embodiments have been described in detail above, variations and modifications exist within the scope and spirit of this disclosure as described and as defined in the following claims.

The invention claimed is:

1. A slip resistant protective sheet made from a blend comprising ethylene vinyl acetate (EVA) and polyethylene (PE), wherein the protective sheet includes a top side that faces away from an object to be protected by the sheet and a bottom side that faces the object to be protected by the sheet, wherein the top side has a raised surface design comprising a plurality of raised ridges, wherein the bottom side has a smoother surface than the top side, wherein the blend imparts slip resistance of the protective sheet, and wherein the blend imparts adhesion of the protective sheet.

2. The protective sheet of claim 1 wherein the protective sheet is used by a workman to walk over and work on.

3. The protective sheet of claim 1 wherein the protective sheet is a single layer formed from a single blend of EVA and PE.

4. The protective sheet of claim 3, wherein a percentage of EVA in the blend varies between about 20 percent and about 80 percent, and the balance is PE.

5. The protective sheet of claim 3, wherein the percentage of EVA in the blend is about 50 percent EVA and the percentage of PE in the blend is about 50 percent.

6. The protective sheet of claim 1, wherein the protective sheet is about 2 mil (about 50.8 micrometers) thick before being embossed and about 4 mil (about 101.6 micrometers) to about 5 mil (about 127 micrometers) thick after being embossed.

7. The protective sheet of claim 1, wherein at least one of the top side and the bottom side has a marker for identification of one of the top and bottom sides.

8. A method for protecting an object comprising: providing a slip resistant protective sheet made from a blend comprising ethylene vinyl acetate (EVA) and polyethylene (PE), the sheet defining a top side having a raised surface design comprising a plurality of raised ridges and a bottom side that is smoother than the top side, wherein the blend imparts slip resistance and adhesion of the protective sheet; and positioning the protective sheet over the object, wherein the top side faces away from the object, and the bottom side faces the object.

9. The method of claim 8, wherein a workman walks over and works on the protective sheet.

10. The method of claim 8, wherein the raised surface design of the top side is configured to retain fluid that is spilled on the protective sheet, reducing the tendency of fluid to run on the top side.

11. The method of claim 8 wherein the protective sheet is a single layer formed from a single blend of EVA and PE.

12. The method of claim 11, wherein the protective sheet is about 2 mil (about 50.8 micrometers) thick before being embossed, and about 4 mil (about 101.6 micrometers) to about 5 mil (about 127 micrometers) thick after being embossed.

13. The method of claim 11, wherein a percentage of EVA in the blend varies between about 20 percent and about 80 percent, and the balance is PE.

14. The method of claim 8, wherein the percentage of EVA in the blend is about 50 percent EVA and the percentage of PE in the blend is about 50 percent.

15. The method of claim 8, wherein at least one of the top side and the bottom side comprises a marker for identification of the top side and the bottom side.

16. The protective sheet of claim 1 wherein the top side is embossed.

17. The method of claim 8 wherein the top side is embossed.

* * * * *